July 28, 1970  D. A. HOLLCROFT ET AL  3,521,661

HOT GAS VALVE

Filed July 28, 1967  2 Sheets-Sheet 1

INVENTORS
DONALD A. HOLLCROFT
RAYMOND D. PALINO
KURT STAIGER

By *William J. Newman*
ATTORNEY

July 28, 1970  D. A. HOLLCROFT ET AL  3,521,661

HOT GAS VALVE

Filed July 28, 1967  2 Sheets-Sheet 2

INVENTORS
DONALD A. HOLLCROFT
RAYMOND D. PALINO
KURT STAIGER

By *William J. Thornton*
ATTORNEY

United States Patent Office 3,521,661
Patented July 28, 1970

3,521,661
HOT GAS VALVE
Donald A. Hollcroft, Raymond D. Palino, and Kurt Staiger, Indianapolis, Ind., assignors to Stewart-Warner Corporation, Chicago, Ill., a corporation of Virginia
Filed July 28, 1967, Ser. No. 656,916
Int. Cl. F16k 31/363
U.S. Cl. 137—220                                           7 Claims

ABSTRACT OF THE DISCLOSURE

A self-regulating, fluid pressure operated sleeve valve for controlling hot gas flow between an inlet passage and an outlet passage, including spring means for biasing the sleeve valve in an open direction, the fluid pressure of the gas flow in the inlet passage tending to close the sleeve valve, a secondary piston carried by the sleeve valve, means for subjecting one side of the secondary piston to atmospheric pressure for moving the sleeve valve toward open position and means for fluid coupling the other side of the auxiliary piston to the gas flow outlet passage.

---

Jet engines for high speed aircraft tend to employ numerous components which surround the engine in the annulus between the engine and the engine cell shroud or housing. The components require cooling and when the aircraft is in flight, they are conventionally cooled by diverting some of the ram air passing through the annulus. However, when the aircraft is standing still, or taxiing with the engines running, the ram air is insufficient to adequately cool the components. Therefore, a ring of nozzles is conventionally placed at the rear of the engine which pass high velocity gases to create a vacuum at the rear end of the annulus for drawing cooling air over the engine components. The hot gases dispersed by the nozzles are taken from the compressor portion at the front of the engine. The flow of gases from the compressor to the nozzles is controlled selectively by valve means opening automatically through a sensor which senses the relative velocity of the aircraft.

Such valves must be capable of handling hot gases from the compressor which range in temperature from 350° to 950° F. with pressure at the valve inlet ranging from 40 to 250 p.s.i.g. Conventional hot gas valves for delivering high velocity gas to the ring of nozzles are of the on-off type which are fully open during the standing or taxiing operation of the aircraft, but are closed during flight. Hence, the valve and all components downstream of the flight must be so constructed as to be capable of withstanding the pressures over the full range of 40 to 250 p.s.i.

It is, therefore, a primary object of this invention to provide an improved hot gas valve for allowing selective delivery of high velocity gas from the compressor portion of a jet engine, while maintaining the pressure of the gases within the valve outlet passage relatively constant regardless of fluctuation in the inlet gas pressure.

It is a further object of this invention to provide an improved hot gas valve of this type which eliminates the need for the components downstream of the control to withstand the relative high pressures of the hot gases delivered from the compressor portion of the engine.

It is a further object of this invention to provide a hot gas valve for controlling the delivery of hot gases from a compressor portion of the engine wherein the escaping inlet fluid from the valve seals is prevented from adversely affecting the regulatory function of the hot gas valve itself.

Other objects of this invention will be pointed out in the following detailed description and claims and illustrated in the accompanying drawings which disclose, by way of example, the principle of the invention and the best mode which has been contemplated of applying that principle.

Figure 1:
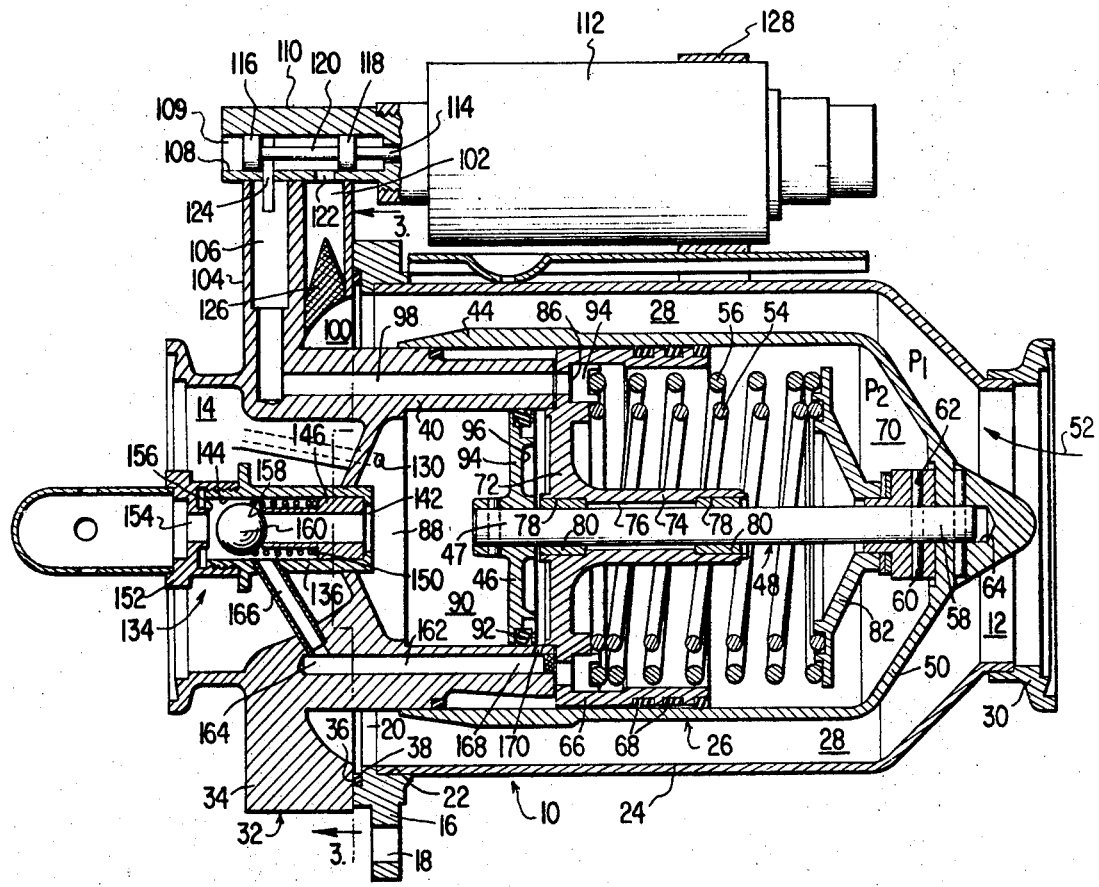
FIG. 1 is a side elevational view, partially in section, of the improved hot gas valve of the present invention with the piston actuator sleeve valve in fully open position.
Figure 2:
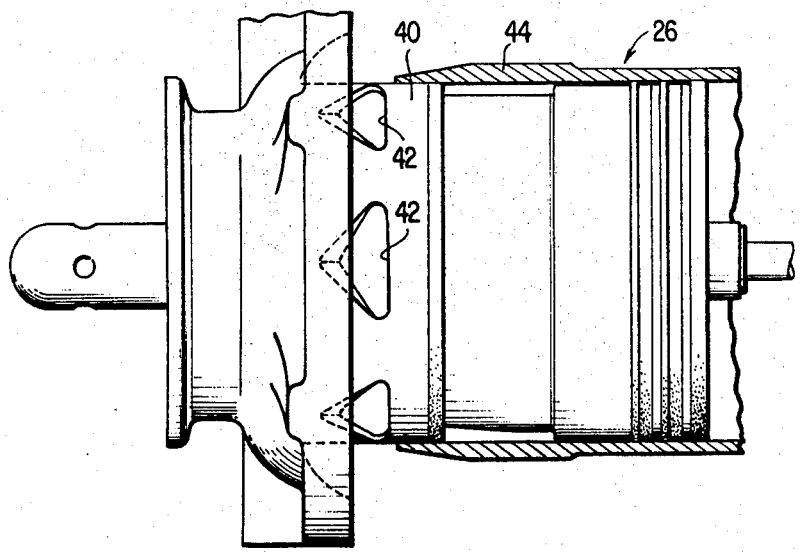
FIG. 2 is an elevation view of a portion of the apparatus shown in FIG. 1 showing the annular array of valve ports carried by the stationary portion of the valve structure.
Figure 3:
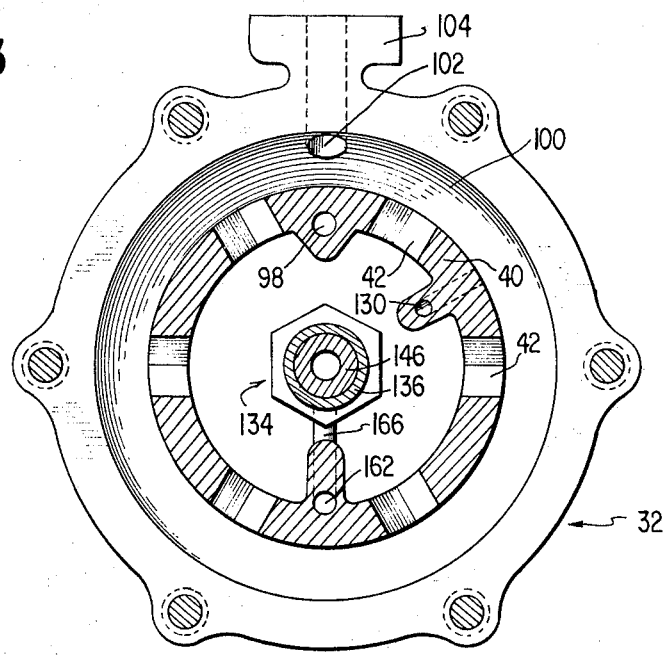
FIG. 3 is an elevational view, partially in section, of the apparatus shown in FIG. 1 taken about lines 3—3.

In general, the apparatus of the present invention comprises an improved, selectively operated, hot gas sleeve valve which cooperates with a stationary support carrying a plurality of circumferentially spaced throttling ports for controlling the gas flow between a valve inlet passage and a valve outlet passage. Spring means are provided for biasing the sleeve valve in its open position against the pressure of the gas flow at the valve inlet passage which acts on a primary piston carried thereby. A secondary piston is carried by the sleeve valve and is subjected on one side to atmospheric pressure tending to move the sleeve valve toward its open position. Further means are provided for fluid coupling the other side of the secondary piston to the sleeve valve outlet passage, whereby the sleeve valve tends to maintain the ports partially open.

Preferably, a solenoid operated control valve selectively controls passage of high pressure fluid from the valve inlet passage acting on one side of a primary piston carried by the sleeve valve to the opposite side of the same primary piston when aircraft velocity is reduced below a predetermined figure.

Further, in a preferred form, a check valve is positioned within the coupling means connecting the valve outlet passage and the other side of the secondary piston, the check valve acting selectively to fluid couple the other side of the auxiliary piston to the atmosphere, to the valve fluid outlet passage, or to both.

Turning to the drawings, the hot gas valve of the present invention is indicated generally at 10 and includes a hot gas valve inlet passage 12 and an outlet passage 14 which are generally coaxial. The valve inlet passage 12 is fluid coupled to the compressor portion of the engine (not shown) such that a portion of the hot gases emanating from the compressor and selectively diverted to the hot gas valve 10, are discharged through the valve outlet passage 14 to a ring of nozzles (not shown) carried at the rear of the engine.

For the purposes of the present invention, it is, therefore, important only to note that the hot gas valve 10 selectively controls on an on-off basis the flow of hot gases through the valve from inlet passage 12 to outlet passage 14, and, in particular, maintains the pressure of the hot gases in the outlet passage 14 at a predetermined constant pressure regardless of the fluctuating pressure of the gases entering the inlet passage 12.

A rigid plate 16 is provided with one or more mounting holes 18 allowing the valve to be stationarily mounted on the aircraft jet engine in conventional fashion. Plate 16 is annular in form, including bore 20 and circular recess 22. The recess 22 receives a cylindrical shell or casing 24 which acts in conjunction with an axially movable piston actuator 26 to define axial hot gas flow passage 28. The cylindrical member 24 is coupled at its upstream end to an annular member 30 which forms, as previously indicated, the inlet passage 12 for the hot gas valve. The annular plate 16 is physically coupled, in sealing relation, to a cast annular, valve housing or casing 32. The housing 32 includes a radial flange section 34 which is mounted to the plate 16 by means not shown. Recess 36 within the contacting face of plate 16 carries an annular sealing ring 38 in conventional fashion. The valve housing or casing 32 further includes a main cylindrical extension portion forming a first cylindrical support member 40 upon which the piston actuator 26 rides. The cylindrical support 40 is provided with a plurality of circumferentially disposed triangular shaped throttling ports 42. The inner end 44 of the piston actuator forms a sleeve valve and selectively covers the ports as the actuator moves from its extreme right-hand position shown in FIG. 1 to the extreme left-hand position shown in FIG. 4. The cylindrical support 40 further acts to receive a secondary piston 46 within bore 86. Secondary piston 46 is coupled to the left-hand end 47 of shaft 48, the right-hand end of the shaft being fixed to and movable with the piston actuator 26. It is noted that the right-hand end of piston actuator 26 includes an end wall 50 which is conical in shape and forms the primary piston for controlling the position of the piston actuator 26. In this respect, the incoming gases, as indicated by arrow 52, impinge upon the outer surface of wall 50 tending to force the piston actuator 26 from right to left against the bias of the two concentric compression coil springs 54 and 56. The right-hand end 58 of the shaft 48 is rigidly coupled to the conical end wall 50 of the piston actuator by means of a transverse pin 60 which is carried by a bore 62 drilled at right angles to the shaft receiving bore 64. A secondary cylindrical support member 66 is coupled to the outer end of the cylindrical support 40, the outer diameter of this member being slightly less than the inner diameter of piston actuator 26. Conventional seals 68 function to fluid seal the inner chamber 70, formed thereby, from the outer annular chamber 28 on the opposite side of the piston actuator. The secondary cylindrical support 66 further includes a transverse end wall 72. Wall 72 carries central cylindrical extension section 74 including a bore 76 and counterbores 78 at either end for receiving sleeve bearings 80. Thus, shaft 48 is slidably received within the central cylindrical extension 74. Since the shaft is rigidly coupled to the piston actuator, the bearing surfaces formed by bearing members 80 and the outer surface of the main and secondary cylindrical support members 40 and 66 function to positively support the piston actuator 26 for axial reciprocation. In response to a fluid pressure differential between chambers 28 and 70, on opposite sides of the primary piston portion 50 of the actuator, the piston actuator moves against the spring bias of compression springs 54 and 56.

It is further noted that the piston actuator carried at the right-hand end of shaft 48, an annular stop member 82, upon the inner surface of which, the right-hand ends of the coil springs 54 and 56 abut. The opposite end of the coil spring 54 abuts the transverse end plate 72 of the secondary cylindrical support member 66. A formed, spring support member 84 is received within an annular recess 86 carried by the same secondary cylindrical support member 66 and receives the left-hand end of coil spring 56. With the secondary cylindrical support member being coupled directly to the end of primary cylindrical support member 40, the transverse wall 72 forms, in conjunction with the inner surface 87 of the cylindrical support member 40 and a spaced end wall 88, a secondary piston receiving chamber 90. The secondary piston 46 is provided with an appropriate seal 92 at its periphery to effectively seal the left-hand face 94 of the secondary piston from right-hand face 96.

In addition to the series of ports 42 which pass radially through the cylindrical support member 40 of the valve housing 32, there is provided, within the same member a first axial fluid passage 98 which also extends through the transverse plate 72 of the secondary cylindrical support member 66. Passage 98 couples the chamber 70 inside of the piston actuator 26, in a selective manner, to the annular passage 28 which is in fluid connection with the hot gas inlet passage 12. The fluid passage 28 terminates at the left-hand end of the assembly in an annular recess 100 which extends about the periphery of the valve housing 32. A vertical channel 102 is formed within radial projection portion 104 of the valve housing 32. At the rear of the radial channel 102, there is provided a second vertical fluid passage 106 which is formed within the same radial projection 104 but is fluid coupled to the axially extending fluid passage 98. The upper ends of the vertical passages 104 and 106 are fluid coupled to axial passage or bore 108 formed within a solenoid valve cylinder 110 carried by solenoid operated bleeder valve assembly 112. The solenoid valve assembly 112 includes a solenoid coil (not shown) and a magnetic armature (not shown) which is physically coupled at its left-hand end to valve shaft 114. The valve shaft incorporates a pair of spaced pistons 116 and 118, forming therebetween, a closed fluid chamber 120. The cylinder 110 includes a first port 122 for fluid coupling vertical passage 104 to the bore 108 and a second port 124 within the same side wall which acts to fluid couple passage 106 to the same bore. The axial spacing between piston sections 116 and 118 is such that when the solenoid valve is energized, the piston 116 moves between ports 122 and 124, venting passage 106 to the atmosphere and preventing fluid communication between radial fluid channels 104 and 106. When the solenoid is de-energized, biasing means (not shown) force the pistons and shaft 114 to their extreme left-hand position in which both wall parts 122 and 124 are fluid coupled by chamber 120, allowing fluid communication between channels 104 and 106. A filter 126 is provided within the inlet channel 104 to the solenoid operated bleeder valve 112 to prevent incoming debris from fouling up the bleeder valve operation. Suitable mounting means 128 effectively couple the solenoid operated bleeder valve assembly 112 to the periphery of the cylindrical wall 24.

It is obvious from the above description that by selective energization, the solenoid operated bleeder valve 112 allows delivery of the hot gas to chamber 70, within the piston actuator, to provide the desired similarity in fluid pressure on opposite sides of the primary piston member or wall 50 to cause the compression springs to bias the piston actuator to its fully open position.

As mentioned previously, the secondary piston 46 is slidably positioned within chamber 90 formed by the inner surface 86 of the primary cylindrical support member 40 and a transverse, somewhat conically shaped end wall 88. One or more openings 130 are formed within this wall and extend, as indicated by the dotted lines 132, through the side wall exterior of the hot gas valve assembly such that chamber 90 on the left-hand side of the secondary piston 46 is subjected to atmospheric pressure. It is important to note that the opening or openings 130 do not extend into the hot gas valve outlet passage 14 but rather open up to the atmosphere.

The transverse wall 88 acts in addition to support a spring-biased ball check valve assembly indicated generally at 134. The check valve assembly comprises an axially positioned cylindrical casing 136, including a right-hand end wall which is bored at 142 and opens up into the chamber 90. The cylindrical chamber 136 is counterbored at 144 and receives a cylindrical valve seat and coil spring support member 146. The outer surface of this member is relieved at 148 to define an annular space for receiving a coil spring 150. At the opposite end of the cylindrical member 136, there is threadedly attached a ball check valve outlet member 152 which includes an annular bore 154 forming a left-hand valve seat 156, as contrasted to a right-hand valve seat 158 formed by the left-hand end of cylindrical member 146. The ball 160 is of a diameter slightly less than the counterbore 144 of cylindrical member 136 and is, in the absence of fluid pressure, spring-biased against the left-hand seat 156 by compression spring 150.

In addition to the axially extending fluid passage 98 formed within the valve housing 32, there is provided a second axially extending fluid passage 162, having its left-hand end 164 fluid coupled to bore 144 of the ball check valve cylinder 136 by means of inclined conduit 166, while its right-hand end 168 opens up into chamber 90, as indicated through radial opening 170 intermediate of the right-hand face 96 of the secondary piston 46 and the left-hand surface of the transverse plate or wall 72 defining the right-hand side wall of chamber 90.

In operation, the on-off function of the valve is controlled by a solenoid operated bleeder valve 112 at the top of the assembly. A pressure sensor (not shown) detects the condition of the plane as being on the ground, either taxiing or sitting still, or in the air, and signals the solenoid operated bleeder valve 112. The solenoid is deactuated with the bleeder valve in the position shown in FIG. 1 when the plane is on the ground. With the valve open, as indicated, most of the hot gases pass through the inlet passage 12, and passage 28 formed by the piston actuator and the cylindrical member 24, and exit through the series of circumferentially spaced triangular ports 42 into the valve outlet passage 14. A portion, however, is bled off through vertical radial passage 104, the solenoid operated bleeder valve chamber 120, vertical passage 106 and the axial passage 98 into the chamber 70 within piston actuator 26. Pressure $P_2$ within chamber 70 is therefore equalized with pressure $P_1$ within inlet passage 12 and with equal pressures on opposite sides of the primary piston 50, the compression springs 54 and 56, in the absence of a fluid pressure differential, drives the piston actuator 26 to the extreme right-hand position, as shown in FIG. 1. The position is defined by stoppage of the secondary piston 46 at the right-hand end of the chamber 90.

Figure 4:
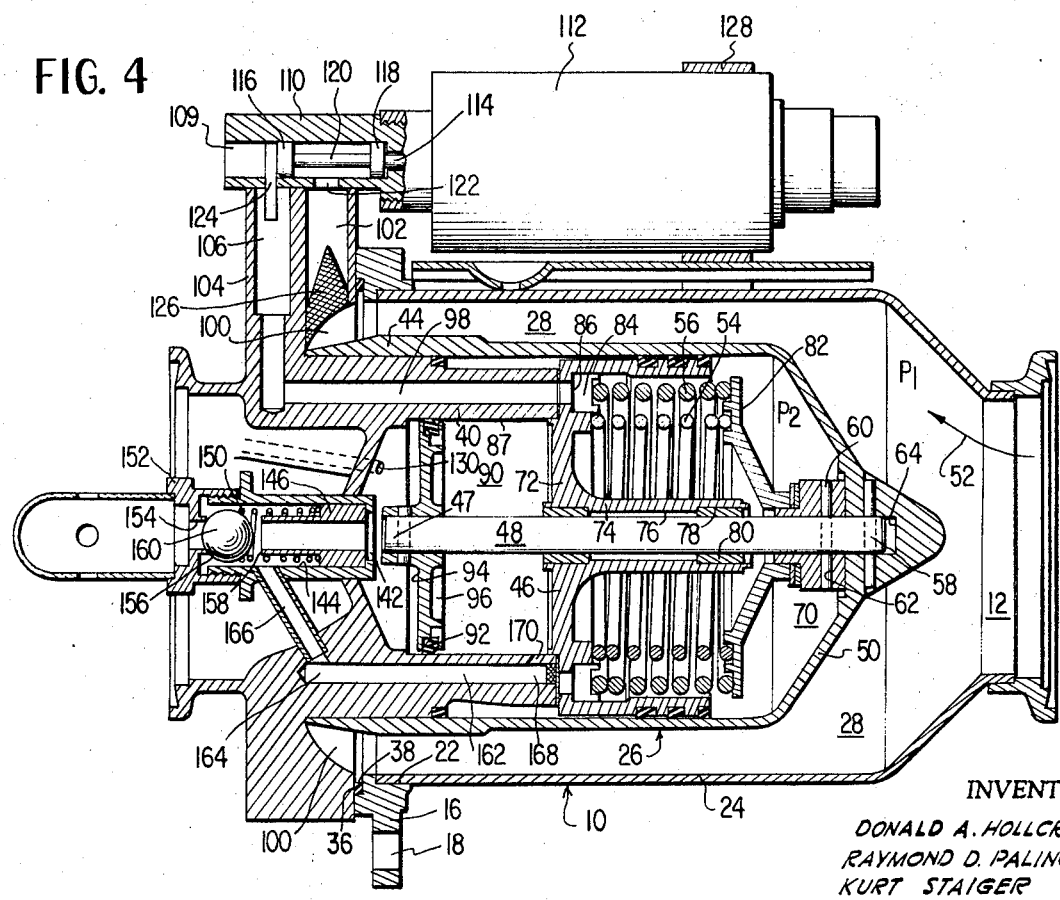
FIG. 4 is the same side elevational view of the apparatus as shown in FIG. 1 with the sleeve valve in fully closed position.

This "ON" operation is to be contrasted sharply to the "OFF" operation when the aircraft is in the air and the solenoid valve 112 is in its actuated state to close off the bleeder port. Referring to FIG. 4, it is noted that upon energization of the solenoid operated bleeder valve 112, shaft 114 moves from left to right, whereupon piston 116 is positioned intermediate of side wall ports 122 and 124 preventing further passage of high pressure gases from radial passage 104 to radial passage 106 and therefore into the piston actuator chamber 70. Note, however, that with the piston 116 of the bleeder valve 112 to the right of port 124, the vertical passage 106 is in fluid communication with the open end 109 of the bleeder valve cylinder 110 and the pressure within chamber 70 drops to atmospheric. In this condition, pressure $P_1$ is much greater than pressure $P_2$ and the piston actuator is held tightly in its leftmost position to close off triangular shaped ports 42.

An important aspect of the present invention is the automatic control of the pressure by means of the cooperative relationship between the concentric coil springs 54 and 56 and the fluid pressures operating on opposed sides of the secondary piston 46.

Referring to FIG. 1, the left or front face 94 of the secondary piston 46 is subjected to atmospheric pressure through vent 130, while the right-hand or rear face 96 of the same secondary piston 46 is connected to the hot gas valve outlet passage 14 by means of port 170, axial passage 162, inclined conduit 166, ball check valve chamber formed by bore 148 and left-hand bore 154 within threaded cylindrical section 152. Assuming the elements of the hot gas valve 10 have reached operating position, with the solenoid operated bleeder valve de-energized, the ball 160 is in the extreme right-hand position shown since the fluid presusre of the gases passing through the outlet passage 14 is in excess of both atmospheric presusre and the biasing force of the compression spring 150 acting on the opposite side of the ball check valve. Obviously, if the pressure of the gases within the outlet passage 14 increase, the same pressure is delivered to the right-hand face 96 of the secondary piston 46 tending to move the piston from right to left and further compressing the concentric coil springs 54 and 56. The left-hand end 44 of the piston actuator 26 covers a greater portion of the triangular shaped ports 42 due to movement of the piston actuator to the left, reducing the port areas to increase the pressure drop of the gases flowing through the ports and therefore reducing the pressure of the hot gas within the valve outlet passage 14. In essence, the hot gas valve of the present invention is designed to provide a constant hot gas output pressure of 26 p.s.i.g. with the sleeve valve action of the piston actuator automatically maintaining this pressure constant regardless of fluctuations in the pressure of the hot gases delivered to the inlet passage 12.

While the valve structure functions adequately, the apparatus of the present invention includes a ball check valve 134 near the output of the device to compensate for internal fluid leakage when going from a shut-off condition ($P_1$ being much greater than $P_2$) to a valve open position ($P_1$ is approximately equal to $P_2$). This would occur when the aircraft lands and slows down to a taxiing speed. The piston actuator 26 is in its leftmost position during high aircraft velocity with the end 44 of the piston actuator effectively covering the triangular shaped ports 42. When the pressure sensor indicates that the aircraft has slowed down enough to require induced cooling airflow to the nozzles at the rear of the engine, de-energization of the solenoid operated bleeder valve causes fluid connection between bleeder ports 122 and 124, with piston 116 to the left of port 124 as shown in FIG. 1. High pressure gases are then bled from annular chamber 28 into the interior chamber 70 of the piston actuator 26. This, of course, has a tendency to cause the piston actuator 26 to move toward the right due to the loss of pressure differential across primary piston 50, under action of the compression springs 54 and 56. However, some leakage of the gases entering the interior of the piston actuator occurs through the seals around the piston rod 48 in the vicinity of bearings 80. As gas pressure is built up within chamber 90 on the right-hand side of the secondary piston 46, it provides a force acting in opposition to the force of the compression springs 54 and 56. The space behind the secondary piston 46 is therefore automatically vented to the atmosphere through a path including radial port 170, axial passage 162, inclined conduit 166, ball check valve chamber formed by bore 144, the opening adjacent annular valve seat 158, the portion of chamber 90 to the left of the secondary piston 46 and the vent port or ports 130. As indicated in FIG. 4, at this moment, the ball check valve 134 is seated against annular valve seat 156 due to the force of compression spring 150. As most of the high pressure gas passes through the triangular ports 42 due to movement of the piston actuator from left to right, the pressure within the valve fluid outlet passage 14 increases. When this pressure within outlet passage 14 reaches approximately 10 p.s.i., the ball 160 moves off its spring constrained seat 156. It reaches the opposite seat 158 at a pressure of approximately 20 p.s.i., so that during the normal regulating function in which the pressure of the hot gases escaping through the outlet passage 14 is maintained at approximately 26 p.s.i.g., the ball 160 is firmly seated in its right-hand position against annular seat 158 to provide a ready path for the valve outlet pressure from passage 14 to the rear face 96 of the secondary or control piston 46.

Since the elements of the hot gas valve are subjected to extremely high temperatures, the members making up the valve are formed of a material appropriate to the circumstances. The stationary and movable members of the hot gas valve may be made of a temperature resistant material, such as 347 stainless steel, while the seals between the moving members may be readily formed of carbon or Stellite. Further, while the hot gas valve of the present invention is particularly applicable to selectively controlling the passage of bleed air of hot gases bled from the compressor for delivery to a series of nozzles associated with a gas turbine engine, the apparatus of the present invention has much broader application to situations requiring a constant pressure output for a high temperature fluid input having some fluid pressure fluctuations.

While the invention has been particularly shown and described with reference to a preferred embodiment, it will be understood by those skilled in the art that the foregoing and other changes in form and details may be made therein without departing from the spirit and scope of the invention.

What is claimed is:

1. A self-regulating valve assembly for controlling fluid flow between a valve inlet passage and an outlet passage comprising a movable valve member, a stationary support member, throttling ports carried by said stationary support member, said throttling ports communicating said inlet and outlet passages and adapted to be progressively closed and opened by said movable valve member, means tending to bias said movable valve member to open said throttling ports, a primary piston carried by said movable valve member and subjected to fluid flow from said inlet passage to move said valve member to close said throttling ports, a secondary piston carried by said movable valve member, means for subjecting one face of said secondary piston to atmospheric pressure for moving said valve member to open said throttling ports, and valve means operable in one direction in response to the pressure in said fluid outlet passage exceeding a predetermined value for fluid coupling the other face of said secondary piston to said valve outlet passage with said valve means thereafter operable further in said one direction in accordance with an increase in fluid pressure in said outlet passage for increasing the fluid coupling between said other face and outlet passage to tend to close said throttling ports and operable in another direction in response to a decrease in fluid pressure in said outlet passage but above said predetermined pressure for decreasing the fluid coupling between said other face and said outlet passage to tend to open said ports whereby the fluid pressure within said outlet passage tends to remain constant regardless of fluctuations in fluid pressure at said inlet passage with said throttling ports remaining partially open.

2. In the valve assembly claimed in claim 1, means controlled by said valve means in the event said pressure in said outlet passage falls below said predetermined value for coupling said other face solely to atmospheric pressure to enable opening of said ports by said valve member.

3. A self-regulating valve assembly for controlling fluid flow between a valve inlet passage and an outlet passage comprising a movable valve member, a stationary support member, throttling ports carried by said stationary support member, said throttling ports communicating said inlet and outlet passages and adapted to be progressively closed and opened by said movable valve member, means for biasing said movable valve member to open said throttling ports, a primary piston carried by said movable valve member and subjected to fluid flow from said inlet passage to move said valve member to close said throttling ports, a secondary piston carried by said movable valve member, means for subjecting one face of said secondary piston to atmospheric pressure for moving said valve member to open said throttling ports, said stationary support member and said movable valve member comprise first and second concentric cylinders respectively, said first stationary cylinder includes a transverse end wall, said movable cylinder includes an open end forming a sleeve valve for covering said ports carried by said stationary cylinder, a closed end wall forming said primary piston, the end wall on said first cylinder and said primary piston forming a first fluid chamber therebetween, said biasing means comprise coil springs carried within said first chamber and having one end abutting said stationary cylinder end wall and the other end abutting said primary piston, and means for fluid coupling the other face of said secondary piston to said valve outlet passage whereby the fluid pressure within said outlet passage tends to remain constant regardless of fluctuations in fluid pressure at said inlet passage with said throttling ports remaining partially open.

4. The assembly as claimed in claim 3 wherein said cylinder forming said stationary support member further includes a second transverse wall spaced from said first wall and forming therewith a fluid chamber, means for positioning said secondary piston within said second chamber, and said means for subjecting one face of said secondary piston to atmospheric pressure comprises vents carried by said second transverse wall.

5. The valve assembly as claimed in claim 3 wherein said first and second cylinders form a first closed fluid chamber including an axially movable wall forming said primary piston, and means for selectively coupling the valve fluid inlet passage to said first chamber to cause said sleeve valve to completely open said throttling ports.

6. The valve assembly as claimed in claim 3 further including means for selectively coupling said first chamber to the atmosphere for ensuring rapid closure of said throttling ports in response to a high fluid pressure differential across said primary piston means.

7. The valve assembly as claimed in claim 3 further including a ball check valve assembly positioned intermediate of said second stationary cylinder chamber and said valve outlet passage, said ball check valve assembly including an axial passage including a first opening at one end coupled to the valve outlet passage and a second opening at the other end coupled to the stationary cylinder chamber, a ball member carried by said ball check valve assembly and a compression spring for biasing said ball against said first opening in the absence of fluid and means for effecting fluid communication between the other face of said secondary piston and said ball check valve assembly, intermediate of said first and second axial openings.

References Cited

UNITED STATES PATENTS

| | | | |
|---|---|---|---|
| 941,153 | 11/1909 | Krichbaum | 137—505.26 XR |
| 2,053,611 | 9/1936 | Hill | 137—495 |
| 2,661,578 | 12/1953 | Niesemann | 137—505.26 XR |
| 3,156,253 | 11/1964 | Marderness | 137—505.18 XR |
| 3,338,259 | 8/1967 | Tribe | 137—220 |

ROBERT G. NILSON, Primary Examiner

U.S. Cl. X.R.

137—495, 505.18, 505.26, 509